No. 696,700. Patented Apr. 1, 1902.
F. TILLMANY.
VEHICLE TIRE.
(Application filed July 5, 1901.)
(No Model.)

WITNESSES:
E. J. Kincaid
Chas. H. Holmes

INVENTOR
Frederick Tillmany
BY
Kincaid & Co.
his ATTORNEYS

THE NORRIS PETERS CO., PHOTO-LITHO., WASHINGTON, D. C.

UNITED STATES PATENT OFFICE.

FREDERICK TILLMANY, OF SAN FRANCISCO, CALIFORNIA, ASSIGNOR, BY DIRECT AND MESNE ASSIGNMENTS, TO TILLMANY STEEL TUBE TIRE COMPANY, A CORPORATION OF CALIFORNIA.

VEHICLE-TIRE.

SPECIFICATION forming part of Letters Patent No. 696,700, dated April 1, 1902.

Application filed July 5, 1901. Serial No. 67,241. (No model.)

*To all whom it may concern:*

Be it known that I, FREDERICK TILLMANY, a citizen of Germany, residing at San Francisco, in the county of San Francisco and State of California, have invented certain new and useful Improvements in Vehicle-Tires; and I do hereby declare the following to be a full, clear, and exact description of the invention, such as will enable others skilled in the art to which it appertains to make and use the same.

My present invention relates to that class of devices known in the art as "vehicle-tires;" and it has for its objects to provide a tire having the requisites of lightness, strength, resiliency, and durability and one in which the first cost is comparatively small.

I dispense with the ordinary pneumatic tire and the disadvantages incident to the use thereof and provide a mechanically-elastic metal tire capable of being quickly and readily positioned on or removed from the grooved rim of the wheel.

Other objects and advantages of the invention will appear to those familiar with this class of devices as the following specification is gone over.

I have clearly illustrated the invention in the accompanying drawings, and in the several views shown have employed like letters of reference to indicate like parts, and in which—

Figure 1:
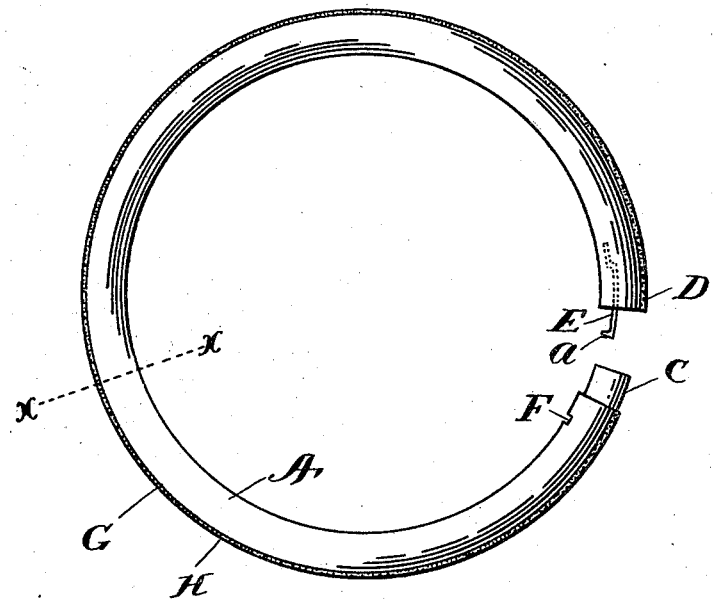
Figure 2:
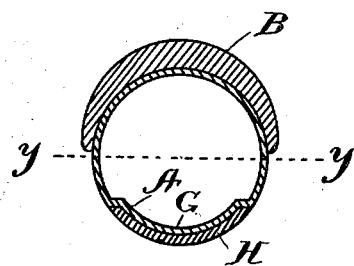
Figure 3:
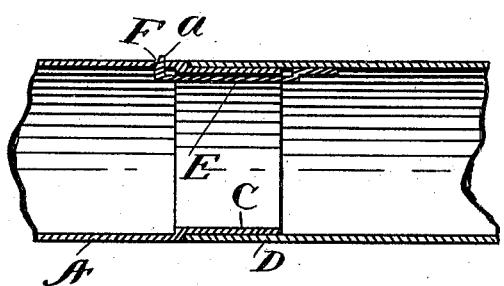

Figure 1 is a side elevation of the complete tire, showing its abutting ends detached from each other and removed from the rim of the wheel. Fig. 2 is a cross-section taken on the line $x$ $x$ of Fig. 1. Fig. 3 is a longitudinal section of the tire, taken through the abutting ends and in the direction of the line $y$ $y$ of Fig. 2.

Referring now to the above views by letter, A represents the main body of the tire, which consists of a thin metal tube of a thickness equal to about 30 gage. This tube A is curved to conform with the periphery of the rim B, the latter being formed in the usual manner with an outer groove for the reception of the tire. The rim or felly B, I have shown in Fig. 2. I will now explain the manner of uniting the abutting ends of this tube A without interrupting the smooth outer contour of the tire.

One extremity C of the tube A is contracted in diameter an amount equal to the thickness of the material, which contraction will permit the opposite female end D of the tube to slip over this male portion C and form a smooth outer surface, as shown in Fig. 3. Now in order to lock these ends of the tube A together, and thereby prevent their springing apart, I have provided the spring E, which is securely fastened to the interior of one end of the tube A. The opposite end of the tube is provided with a perforation F, which is adapted to receive and engage the knob $a$ on the free extremity of the spring E.

From the construction so far gone into it will be seen that the positioning of the tire on the rim is accomplished by simply springing the tube over the rim and then forcing the two ends of the former together until the knob $a$ engages the perforation F. By simply pressing inward the knob $a$, which is reached through a small hole in rim B, the ends of the tire will spring apart ready for removal from the rim. Now in order to provide a durable non-slipping tractional surface for the tire I have caused a portion G of the periphery thereof to be depressed, as shown in Fig. 2, while the space between this portion G and the outer line of the tire I occupy by a tightly-secured strip of compressed leather H.

It will be readily seen from the foregoing description that I have provided a very simple and effective tire which is light, durable, and comparatively inexpensive and which is particularly applicable for use on bicycles, automobiles, and all other light-running vehicles.

I am aware that changes in the form and proportion of parts of the devices herein shown and described as an embodiment of my invention can be made without departing from the spirit or sacrificing the advantages thereof, and I therefore reserve the right to make such changes and alterations as fairly fall within the scope of my invention.

Having thus fully described my invention, what I claim, and desire to secure by Letters Patent, is—

1. A vehicle-tire or the like consisting of a single metal tube formed with a male and a female end, a spring at one end of said tube and a depression in the opposite end, said spring being adapted to engage said depression and hold said ends together, for the purpose set forth.

2. A vehicle-tire or the like consisting of a single metal tube formed with a male and a female end, a continuous depressed portion extending the entire length of said tire, and a compressed-leather strip secured in said depressed portion and forming a non-slipping tractional surface for said tire, substantially as and for the purpose set forth.

In testimony whereof I affix my signature in presence of two witnesses.

FREDERICK TILLMANY.

Witnesses:
GEORGE PATTISON,
ELIZ. KINCAID.